(12) United States Patent
Wootton et al.

(10) Patent No.: US 12,028,732 B2
(45) Date of Patent: Jul. 2, 2024

(54) EXAMINING LATENCY IN COMMUNICATIONS NETWORKS (71) Applicant: SPATIALBUZZ LIMITED, Guildford (GB)

(72) Inventors: Simon Timothy Gerard Wootton, Guildford (GB); Ryan Dominic Shaw, Guildford (GB); Andrew Robert Blake, Guildford (GB)

(73) Assignee: SPATIALBUZZ LIMITED, Guildford (GB)

( * ) Notice: Subject to any disclaimer, the term of this patent is extended or adjusted under 35 U.S.C. 154(b) by 0 days.

(21) Appl. No.: 16/964,727

(22) PCT Filed: Jan. 24, 2019

(86) PCT No.: PCT/GB2019/050201
§ 371 (c)(1),
(2) Date: Jul. 24, 2020

(87) PCT Pub. No.: WO2019/145720
PCT Pub. Date: Aug. 1, 2019

(65) Prior Publication Data
US 2021/0058809 A1 Feb. 25, 2021

(30) Foreign Application Priority Data
Jan. 25, 2018 (GB) ..................................... 1801266

(51) Int. Cl.
*H04W 24/10* (2009.01)
*H04L 43/0864* (2022.01)
(Continued)

(52) U.S. Cl.
CPC ......... *H04W 24/10* (2013.01); *H04L 43/0864* (2013.01); *H04L 43/50* (2013.01);
(Continued)

(58) Field of Classification Search
None
See application file for complete search history.

(56) References Cited

U.S. PATENT DOCUMENTS

| | | | |
|---|---|---|---|
| 7,107,309 B1 * | 9/2006 | Geddes | ............... H04L 67/2804 |
| | | | 709/224 |
| 2002/0120727 A1 | 8/2002 | Curley et al. | |

(Continued)

FOREIGN PATENT DOCUMENTS

CN 104581753 A 4/2015

OTHER PUBLICATIONS

Patents Act 1977: Combined Search and Examination Report under Section 17 and 18(3) for Application No. GB1801266.6 dated Jul. 25, 2018, 6 pages.

(Continued)

*Primary Examiner* — Anh Vu H Ly
(74) *Attorney, Agent, or Firm* — Aikin & Gallant, LLP (57) ABSTRACT

A method of assessing latency in a communications network comprising attempting to contact from a UE in a cellular network a specific internet resource with a HTTP request addressed to the resource, and capturing data specifying the period between making the attempt and receiving at the UE from the resource a response to the request. Thus data can be obtained from which can be made an end-to-end measurement of the latency affecting a user of a UE. Such measurements can be used by the operator of the communications network to, amongst other things, assess whether the network is performing satisfactorily, to advise users about the performance of the network and to determine that hardware or software within the network needs repair, upgrade or augmentation.

25 Claims, 4 Drawing Sheets

(51) Int. Cl.
*H04L 43/50* (2022.01)
*H04L 61/4511* (2022.01)
*H04L 67/02* (2022.01)
*H04W 24/06* (2009.01)

(52) U.S. Cl.
CPC .......... *H04L 61/4511* (2022.05); *H04L 67/02* (2013.01); *H04W 24/06* (2013.01)

(56) References Cited

U.S. PATENT DOCUMENTS

| | | |
|---|---|---|
| 2003/0233445 A1 | 12/2003 | Levy et al. |
| 2011/0202608 A1 | 8/2011 | Nassar et al. |
| 2014/0297846 A1* | 10/2014 | Hoja ................ H04L 43/10 709/224 |
| 2019/0141543 A1* | 5/2019 | Ganapathi ........... H04L 41/0893 |
| 2019/0215731 A1* | 7/2019 | Qiao ................ H04W 24/10 |
| 2019/0245767 A1* | 8/2019 | Di Girolamo ........ H04L 69/164 |

OTHER PUBLICATIONS

International Search Report and Written Opinion for International Patent Application No. PCT/GB2019/050201, dated Aug. 1, 2019.
International Preliminary Report on Patentability for International Application No. PCT/GB2019/050201 dated Aug. 6, 2020, 9 pages.
Examination Report under Section 18(3) for United Kingdom Application No. GB1801266.6 dated Jun. 7, 2019, 5 pages.
Examination Report under Section 18(3) for United Kingdom Application No. GB1801266.6 dated Nov. 11, 2019, 3 pages.

\* cited by examiner

EXAMINING LATENCY IN COMMUNICATIONS NETWORKS

CROSS REFERENCE TO RELATED APPLICATIONS

The present application is a National Phase Entry of International Application No. PCT/GB2019/050201, entitled "EXAMINING LATENCY IN COMMUNICATIONS NETWORKS" and filed on Jan. 24, 2019, which claims priority to Great Britain Application No. 1801266.6, filed Jan. 25, 2018 and entitled "Examining latency in communications networks," both of which are incorporated by reference herein in their respective entireties.

FIELD OF THE INVENTION

The invention relates to the field of mobile communications systems and, in particular, to measuring the performance of a mobile communications system from an end-user perspective.

BACKGROUND TO THE INVENTION

Faults occur in mobile networks, as in all other complex technical systems. Such faults include the failure of hardware components in the base-stations in the mobile network, failures in other systems which are connected to multiple base-stations, for example the radio network controller (RNC) in a 3G system and failures to switching and other more centralised functions.

In addition to the failure of network elements, it is important to identify other problems which contribute to a poor user experience for users of the network. For example, it is common for networks to experience congestion and this can result in a poor experience for users located in the parts of the network which are experiencing congestion. Users located in a congested part of a network may experience a lower data rate than is acceptable for some applications, for example video streaming. They may also experience an increase in network latency, that is: the time taken for a request for an action to be carried out and the result of that action appearing on a user's device.

For example, a mobile device user may be playing a multi-user game on his or her mobile device against or in co-operation with a number of other users who could be located anywhere across the internet (and may or may not themselves be using mobile devices). The said gaming user may press or touch a button on their mobile device, for example to fire an on-screen weapon, and will expect that action to be completed instantaneously, probably within a few milliseconds. If the connection from the mobile device, through the access network (e.g. base-stations), the mobile network's core (e.g. RNCs, switching centres etc.) and, crucially, the content (game) provider's servers and associated network to the game program itself, is not sufficiently fast, the yarning user will experience severe frustration in playing the game (for example the bullet firing "late" causing it to miss its target because the character being fired at has moved). It is this end-to-end latency which is crucial to many users (and not just gaming users). Other examples include remote robotic surgery, where a surgeon in one country controls a robot arm, for example, located in a second country in order to perform an operation on a patient in that (second) country; excess latency can lead to life-threatening errors in such circumstances.

It is worth noting, at this point, that latency and data-rate may be linked but are not necessarily linked. For example it is quite common for a user who is experiencing a poor data rate to also experience a poor level of latency. It is, however, possible for a user to experience a poor level of latency without experiencing a poor data rate. Therefore, by measuring latency, it is possible to diagnose network issues which are not purely associated with congestion (and may, indeed, have nothing to do with congestion, at least not within the mobile network).

When such failures or problems occur, it is important to identify them as quickly as possible, both so that maintenance teams can be dispatched to repair the fault and restore service to the customers of the network, if a fault exists, and also to enable these same customers to be kept informed about the fact that a failure has occurred (hence relieving customer anxiety that their mobile device may be at fault) and also about the progress of a repair and the likely time at which service will be restored. Such information on service failures and repair progress may be provided by a telephone operator on a "helpline" provided by the network operator or via a web-page, mobile phone "App" or other similar interface available to the end user of the network services.

Likewise, if the problem is not caused by a fault but simply by poor network design or excessive loading on the network at a particular point in time, it is important for the network operator to be informed of such issues so that corrective action may be taken, such as adding a new base station to increase capacity in a congested cell.

In other situations, network services may be suspended in order to carry out planned maintenance or upgrades to the network. In such circumstances, the elements of the network (e.g. base-station or stations) which will be affected are known in advance and the duration of the service outage can also be estimated with a reasonable degree of certainty. Again, users may be informed of this upon submitting a query.

In still other situations, poor service may occur as a result of congestion on the network, or overload of a particular network resource which may impact many other resources, for example problems with a transmission link impacting multiple base-stations and hence increasing latency for all connected base-stations. Such situations can occur, for example, during rush hour at a busy train station or around the time of an irregular event, such as a sports match or music concert, at a particular location. Alternatively a severe weather event may impact a specific network element, such as a microwave link, with a consequent knock-on effect on all resources connected to that network element.

At present, the measurement of latency is typically conducted (by mobile-network operators) only upon the mobile network, if at all. This may take the form of a measurement of the latency of the access network, for example the air interface (e.g. WCDMA, LTE etc.) and the base-station as well as the air-interface related elements within the user's device. Alternatively, it may also include the mobile operator's core network as this is also within the control of the mobile operator. Whilst such measures may be useful in some circumstances, they do not provide a complete picture of the user's experience, since there are a number of elements which are not measured, being as how they fall outside of the network operator's control and within the domain of the content (e.g. game) provider.

From a user's perspective, however, it is of little or no interest where the fault lies if a latency issue exists; they are simply interested in those issues being resolved as quickly as possible. In some instances, the issue may lie within the operator's network, up to and including the user's device; for example there may be an issue with how the user's device is set up or what other applications are also running on it at the same time. It is important for a network operator to be able to diagnose where a problem lies in order to solve that problem and thereby retain a happy customer.

A further significant disadvantage of prior art solutions it that they typically rely upon additional hardware installed within an operator's network, in order to perform latency measurements. Such hardware, in the form of one or more "test servers", may be attached to the access network (e.g. within a base-station) or the mobile core network. The cost of purchasing, configuring, installing and maintaining such devices is clearly limiting on the ubiquity of their deployment; it is unlikely to be practicable or economic to, for example, install such a test server at each and every base-station site on a network and it may be impossible with many sites (such as pole-top, lamp-post or other smaller installations).

This invention proposes a system which enables measurements of end-to-end (mobile device to end-content) latency to be made by a user's mobile device without the need for additional hardware being attached to any of: the access network, the core network or a downstream content server. The mobile device itself makes the required latency measurement via an app running on that device and can report the resulting end-to-end latency figure back to the mobile operator's network via that same app.

SUMMARY OF THE INVENTION

According to one aspect, the invention provides a method of assessing latency in a communications network. The method comprises attempting to contact from a UE in a cellular network a specific internet resource with a HTTP request addressed to the resource, and capturing data specifying the period between making the attempt and receiving at the UE from the resource a response to the request. Thus, the invention provides data from which can be made an end-to-end measurement of the latency affecting a user of a UE. Such measurements can be used by the operator of the communications network to, amongst other things, assess whether the network is performing satisfactorily, to advise users about the performance of the network and to determine that hardware or software within the network needs repair, upgrade or augmentation.

In some embodiments, the captured data is a measurement of the duration of the period between making the attempt and receiving at the UE from the resource a response to the request. Measuring the period may comprise measuring the period required to perform a DNS look-up for the resource. Measuring the period may comprise measuring the period required, after any requisite DNS look-up, to perform a HTTP or HTTPS connect operation to the resource. Measuring the period may comprise measuring the period required, after any requisite DNS look-up and after any requisite HTTP or HTTPS connect operation, to receive content from the resource. Thus, the aspect of the network which is primarily contributing to latency can be determined more precisely.

In other embodiments, the data is the time point of making the attempt and the time point of receiving the response at the UE.

In some embodiments, the method further comprises reporting the data from the UE to assessing means for assessing latency issues in the communication network.

In some embodiments, the assessing means comprises a computer arranged to collect latency measurements from other UEs also. Thus, data from multiple UEs can be aggregated to diagnose problems with the communication network.

In some embodiments, the assessing means comprises a computer arranged to derive, from the data and from latency measurements from other UEs also, information about latency issues in the communication network, and to present the information to a user.

In some embodiments, the HTTP request is an un-encrypted, HTTP, request.

In other embodiments, the HTTP request s an encrypted, HTTPS, request.

In some embodiments, the HTTP request method is one of GET, POST, HEAD, PUT, DELETE, OPTIONS and CONNECT.

In some embodiments, the internet resource is configured to respond to the HTTP request with an indication of connection success but no content. Thus, network latency can be measured while keeping data usage down.

In some embodiments, the HTTP request uses a POST request method containing a blank submitted-data field. This provides an advantage of avoiding unnecessary data traffic.

In some embodiments, the HTTP request uses a GET request method and the method further comprises terminating a connection established, on the basis of the HTTP request, between the UE and the resource, upon the UE detecting that connection has been established. This provides an advantage of avoiding unnecessary data traffic.

In some embodiments, attempting to contact is precipitated by fulfillment of a condition, the condition being one or more of: a push request to the UE from another computing device; passage of a specific time interval; the UE changing the bearer that it is using in the communications network; the UE moving more than a specified distance within a specified duration of time; a request from a user of the UE to perform a latency test; and a request from the communications network to perform a latency test.

BRIEF DESCRIPTION OF THE FIGURES

By way of example only, certain embodiments of the invention will now be described by reference to the accompanying drawings, in which.

DETAILED DESCRIPTION

Figure 1:
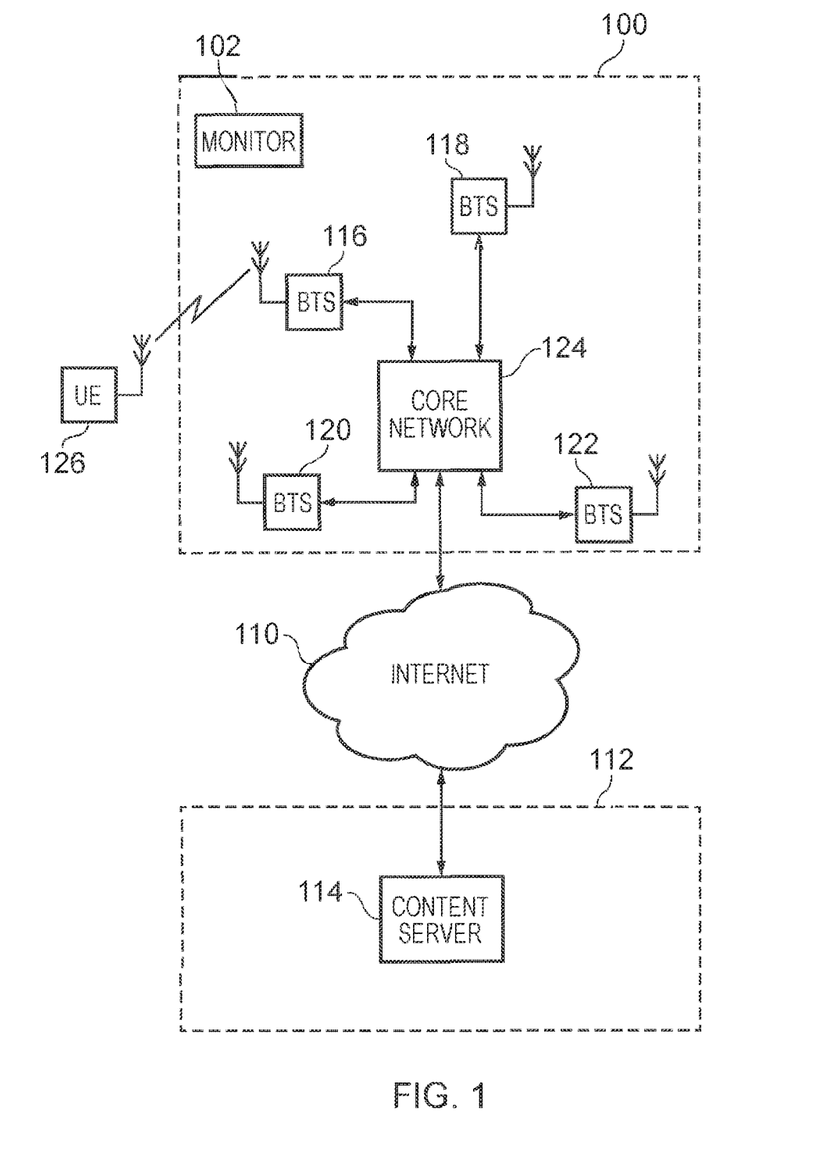
FIG. 1 is a schematic illustration of some cooperating communications networks.

FIG. 1 shows three cooperating networks 100, 110 and 112. Network 100 is a proprietary cellular communications network, such as a 4G mobile telephony network. Network 110 is the internet. Network 112 is a video game provider's proprietary network. The game provider's network 112 contains a content server 114 which serves game data (e.g. for a multi-player video game) that can be served to game players via the internet 110.

Cellular network 100 contains a number of base stations 116-122 that communicate with a core network 124. Of course, in practice, there will be many more base stations than the four that are shown in the figure. User equipment (UE), such as smartphones, laptops or smart meters, establish wireless connections with the base stations of the cellular network 100 in order to conduct communications. The manner in which UEs establish these connections and conduct communications through cellular wireless networks is well known. In the same vein, the constitution and operation of the core network 124 in such a cellular wireless network is also well known and requires no detailed explanation here. Within the core network 124, data is transferred using Internet Protocol (IP). The core network also uses IP to communicate over the internet 110 to other networks, such as the game provider's network 112.

Figure 4:
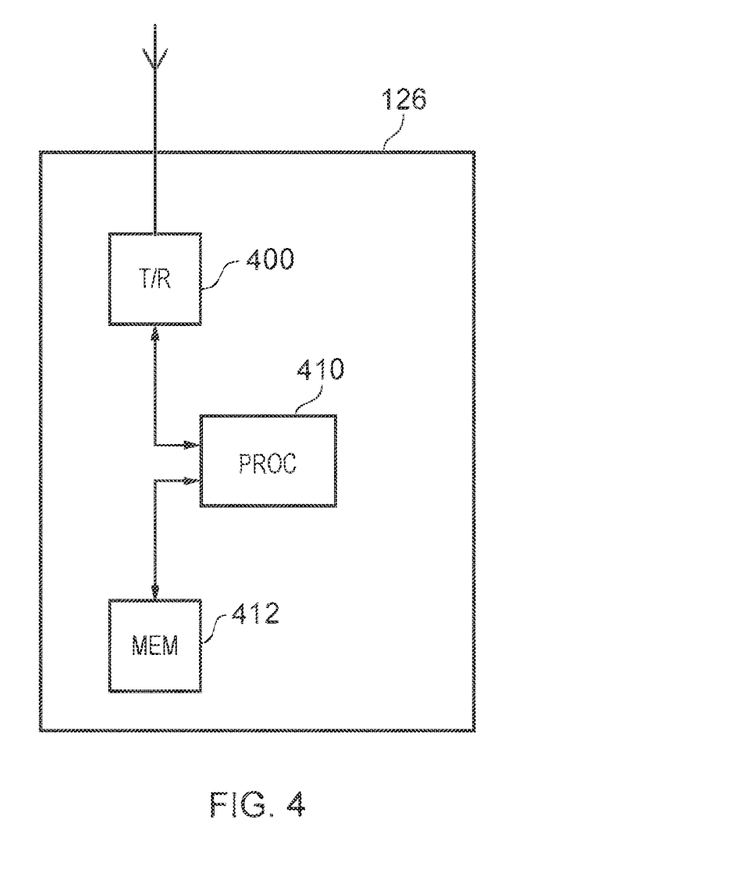
FIG. 4 is a block diagram schematically illustrating a UE (user equipment).

FIG. 1 also shows a UE 126 connected wirelessly to base station 116 over, say, a 4G bearer. The UE 126 is shown schematically in FIG. 4 and comprises a transceiver 400, a processor 410 and a memory of 412. The processor 410 controls the operation of the UE 126 on the basis of program instructions contained in the memory 412. The transceiver 400 is the means by which the UE 126 conducts wireless communication with the cellular network 100.

Assume, for the sake of argument, that the UE 125 is a smartphone and its user wishes to participate in a multi-player game hosted on the game provider's network 112. The UE 126 makes a wireless connection to base station 116 and over that connection sends a request to the content server 114 for the server to deliver game data to the UE. Latency effects may hamper the participation of the user in the multi-player game. For example, in an action game, the relative timing of commands issued by different players will usually have a direct impact on the progress of the game, and latency effects will distort that relative timing. Therefore, it is of interest to be able to measure the end-to-end latency between the UE 126 and the content server 114. That is to say, the latency that is the time that elapses between sending a request from the UE 126 destined for the content server 114 and receiving at the UE 126 a response from the content server 114.

Figure 2:
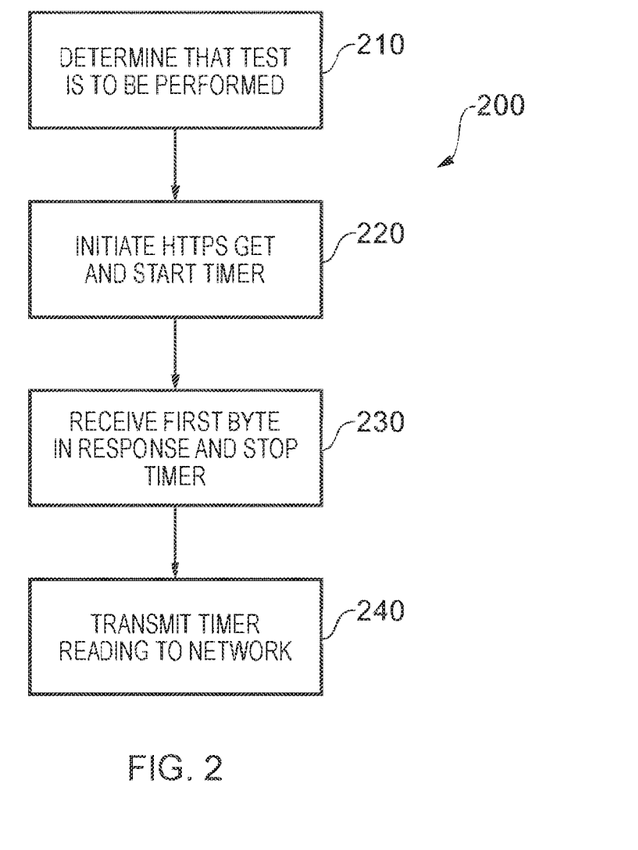
FIG. 2 is a flow chart of a process performed by a user's mobile device to measure latency affecting the device.

In order to make such a measurement, the UE 126 can perform the latency measurement procedure that is outlined in FIG. 2. Information that is derived about latency issues affecting the users of the cellular network 100 is collected by a monitoring station 102 in the cellular network 100. The proprietor of the cellular network 100 can thus use the monitoring station to evaluate latency issues affecting the users of the cellular network, irrespective of whether the cause of any undesirably large latency lies inside or outside the cellular network 100.

The latency measurement procedure 200 in FIG. 2 commences with step 210, in which it is determined whether or not a trigger is present in order for a latency measurement to be made. In a simple case, the trigger may be a request from the user of the UE 126 for a latency measurement to be made. When it is determined that the trigger condition is met, the procedure moves on to step 220.

In step 220, the UE 126 issues a HTTPS GET request method addressed to the content server 114 and starts a timer. The procedure 200 then moves on to step 230.

In step 230, the UE 126 waits to receive the first byte of the response from the content server 114 in reply to the GET request method. Upon receipt of that first byte, the timer is stopped. The procedure then moves on to step 240.

In step 240, the period of elapsed time captured by the timer in step 230 is transmitted by the UE 126 to the monitoring station 102 within the cellular network 100. Then, the procedure 200 ends.

By carrying out latency measurement procedure 200, the UE 126 can measure the time it takes for data to travel from the UE 126 to the content server 114 and for the response from the content server 114 to reach the UE 126. This measurement is an assessment of the end-to-end latency that the UE 126 experiences when communicating with the content server 114. It will be appreciated, of course, that the procedure 200 can be used to measure the end-to-end latency between any UE in the cellular network 100 and any computing resource that can be reached at an IP address. The monitoring station 102 may function in the same way as the system disclosed in GB2546119A, for example with the latency measurements from UEs becoming another input to the "combiner 110" that is described in that document. One example of the type of analysis which can be conducted is to examine the statistical distribution of the connectivity times received from a number of or all cell sites (say) within a network, based upon a large number of latency measurements, and then to specifically highlight the sites (or groups of sites with a common higher level element, e.g. an RNC or transmission link) which form the highest 5% (say) of average latency times. Being in this group is likely to indicate that a cell site is performing poorly and this can then be reported to the network operations staff of the operator of network 100.

Various modifications are of course possible to the latency assessment scheme described in detail above. Some such modifications will now be described, though it will of course be understood that the scope of protection conferred by this patent is limited only by the claims, interpreted, to the extent necessary, on the basis of the description and drawings.

According to the discussion above, the latency assessment is triggered by a request from the user of the UE. Of course, other trigger conditions may be used. For example, any of the following could be trigger conditions for initiating the latency assessment:

An incrementing period timer reaching a pre-determined value (or an internal clock within the UE or an external clock located within or connected to the mobile network 100 indicates that a pre-determined time period has elapsed since the last test). This way, the system can obtain regular, timed, latency measurements, e.g. every 10 minutes.

The geospatial movement of the device exceeding a minimum displacement threshold e.g. use moves beyond a geofence distance of, say, a 500 m from their previous location.

Receipt of a "push" notification from an external server requesting that a latency test should be initiated by the UE. This is particularly useful if the UE utilises the iOS® operating system since this system is currently unable to perform periodic tests.

A change of network event, for example a change of bearer (e.g. from 3G to 4G, or 4G to Wi-Fi)

An indication from an internal or external geolocation system that the UE has moved more than a certain distance from a location at which an immediately-prior latency measurement was taken.

A request from the network for a latency measurement to be taken by the UE (either a manual request by a network maintenance operative or an automated, perhaps random, request).

A user initiating a query regarding network performance.

The above list is not exhaustive and many other criteria may be used to trigger a measurement. Additionally, the trigger condition could be composite. For example, the trigger for performing the latency assessment could be that a predetermined time has elapsed since the last latency test and that the UE has moved more than a certain distance since the last latency test was performed.

In the latency assessment techniques described above, the measurement of latency time is based around the transmission of a HTTP request to a target server (which is generally an independent controlled publically accessible web server over which no control can be exercised by a network operator), and reception of the response. This both simplifies the hardware requirements of the technique described herein and greatly extends the range and variety of target servers which can be used.

As those web servers aren't controlled by the operator, the measurement process does not require any specific test data to be uploaded to the server, nor any testing specific software to be installed on the server for the test process to work.

It is desirable to use a HTTP request method that is supported by the majority of publically accessible web servers. This is normally the HTTP GET request method, but it is also possible to use any other valid HTTP request method, such as HEAD, OPTIONS, POST, PUT or PATCH. If POST, PUT or PATCH methods are used, then a zero-byte data payload would be used. Usually most independent web servers do not support POST, PUT or PATCH request methods to arbitrary resources, and so their usefulness is limited.

In procedure 200 above, the GET HTTP request is addressed to the content server 114 that is to provide the game data for the game that is being played by the user of UE 126. It is possible to establish a server at a specific IP address especially for a handling a GET HTTP request that is timed for measuring latency. Such a server can be configured to respond to a GET HTTP request with nothing more than a response indicating that a successful connection has been made; that is to say, to respond without any payload or content in order to keep data usage down. An example of the form of the minimal response body would be:

HTTP/1.1 204 No Content
Content-Length: 0
Date: Wed, 23 Aug. 2017 10:03:13 GMT
Proxy-Connection: Keep-alive The response above includes little more than the HTTP status code "204", which indicates that "the server has successfully fulfilled the request and there is no additional content to send in the response payload body". For the purpose of testing for network connectivity, Google's Android OS currently uses a certain server located at the URL:

https://www.gstatic.com/generate_204

The server at this URL purposely does not return any content in response to a GET HTTP request, other than an HTTP success response. This server could be used to make latency measurements using procedure 200, with the advantage that the response to the GET HTTP request will have the minimal response body set out above. An equally valid approach would be to use a publically accessible web server that returns a HTTP 200 response with a zero-byte data payload.

As a further alternative, any accessible web server URL could be used which responds with any status code and a non-zero data payload. However to avoid the data payload download impacting the latency measurement, the client would immediately abort the connection before retrieving the data payload. An advantage of this abortive approach would be that it would be possible to use any web server that responded to HTTP/HTTPS connection requests. A disadvantage would be it would be impossible to know if a successful HTTP/HTTPS response would have occurred.

In the foregoing discussion of various latency assessment techniques, reference has been made to forwarding to the monitoring station 102 time periods that have been measured by starting and then stopping a timer. Instead, the time points of the beginning and end of a period under evaluation could be captured, and those time points forwarded to the monitoring station 102 for the time period between the time points to be deduced there. In addition, it will be understood that the timers utilised in the latency measurements could be implemented in software or in hardware or as a combination of the two.

Rather than simply measuring the overall time period between issuing the GET HTTP request from a UE and receiving the response back at that UE, the durations of individual tasks making up the overall period can be measured separately. A method of doing this will now be described by reference to FIG. 3.

Figure 3:
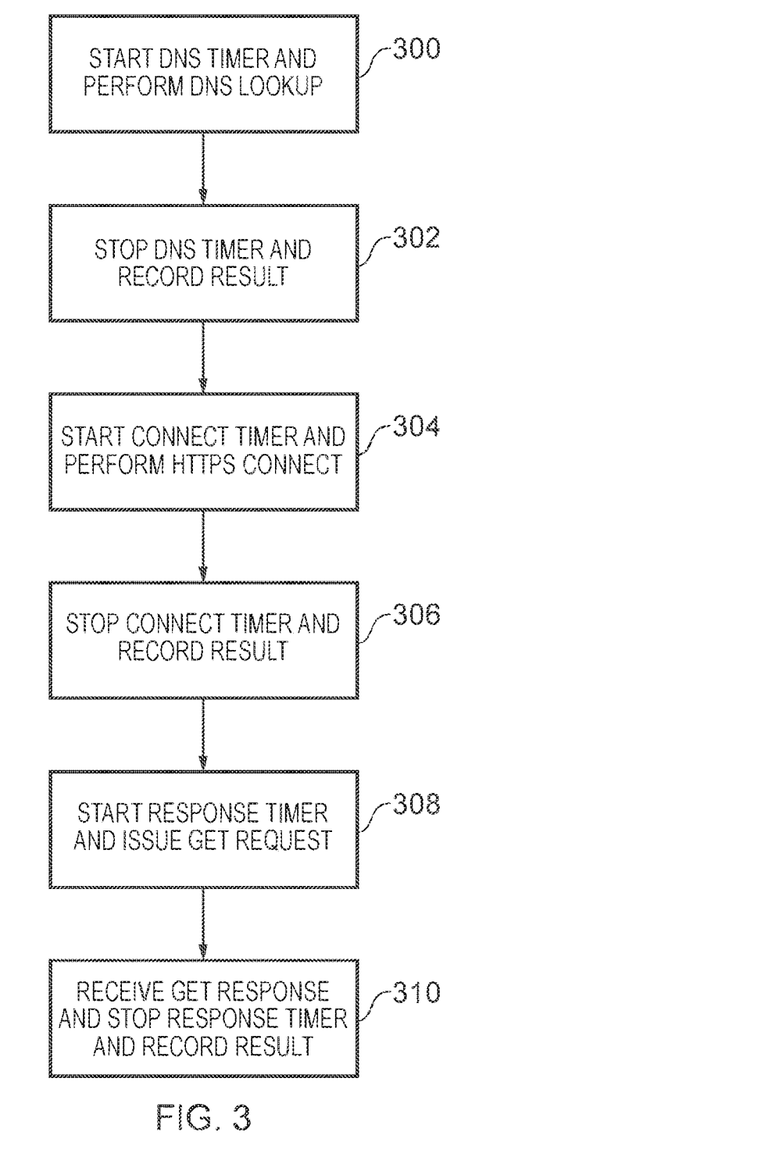
FIG. 3 is a flow chart describing in more detail some of the steps of the flow chart of FIG. 2.

FIG. 3 illustrates a process that stands as an alternative to steps 220 and 230 of procedure 200. In this variant, upon determining that a latency assessment is to be made, step 300 is performed. In step 300, a timer is started and a DNS lookup is initiated for the URL to which the GET HTTP request is to be sent. Next, in step 302, when the DNS lookup process is complete, the timer is stopped and the duration of the DNS lookup process is recorded. The DNS period recorded in step 302 is a measure of the time for the domain name to be resolved to an IP address, and the IP address is typically looked up in a cache in the operating system (OS) of the UE or is obtained from a domain name system (DNS) of an internet service provider (ISP). The DNS period includes the following time components (which can't be separated out individually): user device, air interface, core network, Internet and DNS server. After step 302, the process then moves on to step 304.

In step 304, a timer is started and a HTTPS connect process (a TLS or SSL handshake) is initiated to establish a connection to the target of the GET HTTP request that resides at the IP address obtained from the DNS lookup. Next, in step 306, when the HTTPS connect process is complete, the timer is stopped and the duration of the HTTPS connect process is recorded. The HTTPS connect period recorded in step 306 is a measure of the time for the TCP handshake and secure connection setup to complete between the UE and the target of the GET HTTP request. After step 306, the process then moves on to step 308.

In step 308, a timer is started and the GET request is sent to the target with which a HTTPS connection was established in step 304. Next, in step 310, when the response to the GET request is received back at the UE, the timer is stopped and the period taken to obtain a response to the GET request is recorded.

After the conclusion of step 308, the three recorded time periods—that is to say, the DNS period recorded in step 302, the HTTPS connect period recorded in step 306 and the GET response period recorded in step 310—are then transmitted to the monitoring station 102. The three time periods may be analysed mathematically, in order to determine more precisely the aspect of the network which is primarily contributing to latency. Thus, the process shown in FIG. 3 provides a more detailed understanding of the processes and effects that contribute to the end-to-end latency that is obtained by the single simple overall latency measurement that is sent in step 240 of procedure 200.

In a further variant of the FIG. 3 process, step 308 and its measurement of the response period are omitted, by aborting the HTTPS connection as soon as it has been reported as successfully established. This type of measurement would give an indication of latency, but without the knowledge of whether a successful response would have been possible. In a similar way, in procedure 200 of FIG. 2, step 230 could be modified so that the timer is stopped upon detecting that the connection to the GET HTTP request's target has been made successfully rather than upon receiving the first byte of the response body.

While the foregoing latency assessment techniques involve timing request-response commands generated under the hypertext transfer protocol secure (HTTPS) scheme, it is also possible to use request-response commands sent under the HTTP scheme instead. In general, however, HTTPS is preferred over HTTP for carrying out the latency test described above because HTTPS is now more commonly used than HTTP for the exchange of valuable data (such as game data and movie streaming data), meaning that the test is more likely to reflect real user experience if HTTPS is used.

Whilst the above discussion has focused on measuring a latency time for a successful connection, the invention described herein is equally useful in identifying when an attempted connection has not been made. This might be because there is no coverage provided at the location at which the user device is situated or it might be due to a problem with the cell site to which the user is connected. In either case, the fact that a connection could not be made, together with the location at which the attempt to connect took place, can be stored on the user's device until such time as a valid connection is made to the network, at which time data detailing the failed connection can be transferred to the network.

The foregoing discussion of latency assessment techniques has focussed on the assessment of latency in the exemplary scenario of multi-user video games. Of course, it goes without saying that the latency assessment techniques described in this document are applicable to any other scenario where a UE has to communicate with an internet resource via a cellular network. The internet resource in question is almost limitless in its diversity; the internet resource could, for example, be a web server, a telesurgical tool or a pan-tilt-zoom (PTZ) camera.

The invention claimed is:

1. A method of assessing latency in a communications network, the method comprising:
attempting to contact from user equipment (UE) in a cellular network a specific internet resource by means of sending an HTTP request addressed to the resource;
receiving an HTTP response in response to the HTTP request, wherein receiving the HTTP response establishes an HTTP connection between the UE and the resource;
capturing data specifying a period from sending the HTTP request to receiving at the UE from the resource the HTTP response to the HTTP request; and
terminating the HTTP connection in response to receiving the HTTP response, wherein the HTTP connection is terminated without any additional data of any form having been received during the HTTP connection.

2. The method according to claim 1, wherein the data specifying the period is a measurement of the duration of the period.

3. The method according to claim 2, wherein measuring the period comprises measuring the period required to perform a DNS look-up for the resource.

4. The method according to claim 2, wherein measuring the period comprises measuring the period required, after any requisite DNS look-up, to perform a HTTP or HTTPS connect operation to the resource.

5. The method according to claim 2, wherein measuring the period comprises measuring the period required, after any requisite DNS look-up and after any requisite HTTP or HTTPS connect operation, to receive content from the resource.

6. The method according to claim 1, wherein the data specifying the period is the time point of making the attempt and the time point of receiving the response at the UE.

7. The method according to claim 1, wherein the HTTP request is one of an un-encrypted HTTP request and an encrypted HTTPS request.

8. The method according to claim 1, wherein the HTTP request is one of GET, POST, HEAD, PUT, DELETE, OPTIONS and CONNECT.

9. The method according to claim 1, wherein the internet resource is configured to respond to the HTTP request with an indication of connection success but no content.

10. The method according to claim 9, wherein the HTTP request uses a GET request method.

11. The method according to claim 1, wherein the HTTP request uses a POST request method containing a blank submitted-data field.

12. The method according to claim 1, wherein the HTTP request is a GET request method.

13. The method according to claim 1, wherein attempting to contact is precipitated by fulfilment of a condition, the condition being one or more of:
a push request to the UE from another computing device;
passage of a specific time interval;
the UE changing a bearer that it is using in the communications network;
the UE moving more than a specified distance within a specified duration of time;
a request from a user of the UE to perform a latency test; and
a request from the communications network to perform a latency test.

14. User equipment (UE) for operation in a cellular network, the UE comprising:
transceiving means for communicating wirelessly with the cellular network; and
processing means arranged to:
attempt to contact via the cellular network via the transceiving means a specific internet resource by means of sending an HTTP request addressed to the resource;
receiving an HTTP response in response to the HTTP request, wherein receiving the HTTP response establishes an HTTP connection between the transceiving means and the resource;
capture data specifying a period from sending the HTTP request to receiving via the transceiving means from the resource the HTTP response to the HTTP request; and
terminate the HTTP connection in response to receiving the HTTP response, wherein the HTTP connection is terminated without any additional data of any form having been received during the HTTP connection.

15. The UE according to claim 14, wherein the data specifying the period is a measurement of the duration of the period.

16. The UE according to claim 15, wherein the measurement comprises a valuation of the period required to perform a DNS look-up for the resource.

17. The UE according to claim 15, wherein the measurement comprises a valuation of the period required, after any requisite DNS look-up, to perform a HTTP or HTTPS connect operation to the resource.

18. The UE according to claim 15, wherein the measurement comprises a valuation of the period required, after any requisite DNS look-up and after any requisite HTTP or HTTPS connect operation, to receive at the UE content from the resource.

19. The UE according to claim 14, wherein the data specifying the period is the time point of making the attempt and the time point of receiving the response at the UE.

20. The UE according to claim 14, wherein the HTTP request is one of an HTTP un-encrypted request and an HTTPS encrypted request.

21. The UE according to claim 14, wherein the HTTP request is one of GET, POST, HEAD, PUT, DELETE, OPTIONS and CONNECT.

22. The UE according to claim 14, wherein the HTTP request uses a POST request method containing a blank submitted-data field.

23. The UE according to claim 14, wherein the HTTP request uses a GET request method.

24. The UE according to claim 14, wherein the processing means is arranged detect a condition and to make the attempt to contact the internet resource upon detecting that the condition is fulfilled, and wherein the condition is one or more of:

a push request to the UE from another computing device;
passage of a specific time interval;
the UE changing a bearer that it is using in the cellular network;
the UE moving more than a specified distance within a specified duration of time;
a request from a user of the UE to perform a latency test; and
a request from the cellular network to perform a latency test.

25. A method of assessing latency in a communications network, the method comprising:
attempting to contact from a user equipment (UE) in a cellular network a specific internet resource with a HTTP request addressed to the resource; and
capturing data specifying a period from sending the HTTP request to receiving at the UE from the resource an HTTP response to the HTTP request;
wherein the resource is configured to respond to the HTTP request with an HTTP response to the request indicative of an HTTP connection to the UE, and wherein the HTTP connection is terminated in response to the HTTP response without the resource providing additional data of any form to the UE during the HTTP connection to the UE.

* * * * *